(12) United States Patent
Shi et al.

(10) Patent No.: US 10,467,681 B2
(45) Date of Patent: Nov. 5, 2019

(54) SYSTEM, METHOD, AND MEDIUM FOR MATCHING ORDERS WITH INCOMING SHIPMENTS

(71) Applicant: SAP SE, Walldorf (DE)

(72) Inventors: Xingtian Shi, Shanghai (CN); Gufei Sun, Shanghai (CN); Heng Wang, Shanghai (CN); Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 1156 days.

(21) Appl. No.: 13/644,819

(22) Filed: Oct. 4, 2012

(65) Prior Publication Data

US 2014/0100992 A1    Apr. 10, 2014

(51) Int. Cl.
*G06Q 30/00* (2012.01)
*G06Q 30/06* (2012.01)

(52) U.S. Cl.
CPC .............................. *G06Q 30/0635* (2013.01)

(58) Field of Classification Search
CPC .................................................. G06Q 30/0635
USPC ....................................................... 705/26.81
See application file for complete search history.

(56) References Cited

U.S. PATENT DOCUMENTS

| | | | | |
|---|---|---|---|---|
| 6,546,302 B1 * | 4/2003 | Bergeon | ............... | G06Q 10/087 700/100 |
| 6,804,211 B1 * | 10/2004 | Klein | ................... | H04B 7/2656 370/329 |
| 7,715,031 B2 * | 5/2010 | Westervelt | ............ | G06F 3/1205 358/1.15 |
| 2006/0047575 A1 * | 3/2006 | Palazzo | .................. | G06Q 30/02 705/26.81 |
| 2007/0038987 A1 * | 2/2007 | Ohara | ....................... | G06F 8/45 717/151 |
| 2007/0050195 A1 * | 3/2007 | Malitski | ................. | G06Q 10/04 705/333 |
| 2007/0050224 A1 * | 3/2007 | Malitski | ........... | G06Q 10/06312 705/7.22 |

(Continued)

OTHER PUBLICATIONS

Emergent synthesis based approaches to co-creative production planning in job shops (Year: 2003).*

*Primary Examiner* — Jeffrey A. Smith
*Assistant Examiner* — Lalith M Duraisamygurusamy
(74) *Attorney, Agent, or Firm* — Klarquist Sparkman, LLP

(57) ABSTRACT

The embodiments provide a system for matching orders with incoming shipments. The system may include a product shipment handler configured to receive product shipment information specifying incoming products, a product order handler configured to receive product order information specifying a plurality of product orders and input parameter information associated with each product order, a job dispatcher configured to create a plurality of jobs based on the product shipment information and the product order information, a modeling tool configured to model each job as a separate constrained linear optimization problem, and a linear solver configured to solve each constrained linear optimization problem based on the input parameter information and the product shipment information including generating a delivery plan for each product order within a respective job that matches at least one incoming product with a corresponding product order over a period of time.

19 Claims, 8 Drawing Sheets

(56) References Cited

U.S. PATENT DOCUMENTS

| | | | |
|---|---|---|---|
| 2009/0070176 A1* | 3/2009 | Altice | G06Q 10/06 705/7.25 |
| 2009/0259561 A1* | 10/2009 | Boys | G06Q 10/08 705/26.1 |
| 2010/0082724 A1* | 4/2010 | Diyankov | G06F 17/16 708/520 |
| 2010/0161366 A1* | 6/2010 | Clemens | G06Q 30/0201 705/7.29 |
| 2010/0169257 A1* | 7/2010 | Wei | G06F 17/11 706/46 |
| 2010/0257116 A1* | 10/2010 | Mehta | G06Q 10/06 705/348 |
| 2010/0274383 A1* | 10/2010 | Wilke | B07C 3/00 700/223 |
| 2010/0287073 A1* | 11/2010 | Kocis | G06Q 10/047 705/28 |
| 2013/0151372 A1* | 6/2013 | Liu | G06Q 30/08 705/26.9 |

* cited by examiner

SYSTEM, METHOD, AND MEDIUM FOR MATCHING ORDERS WITH INCOMING SHIPMENTS

BACKGROUND

When a customer orders a product from a retailer, the retailer first checks if such product is available in stock. If the product is in stock, the retailer will deliver the product from his/her inventory. Otherwise, the retailer may look into the shipments in route and check to see if such delivery in the near future can meet the customer's demand. In the area of electronic appliances, it may be important for retailers to match incoming shipments with customers' product orders to optimize the revenue and keep the customer satisfied. Also, product orders sometimes permit partial delivery and/or partial fulfillment. A partial delivery situation occurs when a seller cannot deliver all the products in a product order to the customer at once, and the customer agrees that the products can be delivered partially. A partial fulfillment situation occurs when the seller cannot fully satisfy the requirements of the customer because of limited storage and/or transportation capacity, fluctuations in customer demand, and/or delays in the delivery of product components, for example, and the seller partially fulfills the product order by delivery a portion of the ordered products. However, conventional methods do not provide a mechanism that matches incoming shipments with product orders in an efficient and/or accurate matter, as well as account for partial delivery and partial fulfillment situations.

SUMMARY

The embodiments provide a system for matching orders with incoming shipments. The system may include a product shipment handler configured to receive product shipment information specifying incoming products, a product order handler configured to receive product order information specifying a plurality of product orders and input parameter information associated with each product order, a job dispatcher configured to create a plurality of jobs based on the product shipment information and the product order information, a modeling tool configured to model each job as a separate constrained linear optimization problem, and a linear solver configured to solve each constrained linear optimization problem based on the input parameter information and the product shipment information including generating a delivery plan for each product order within a respective job that matches at least one incoming product with a corresponding product order over a period of time.

The product shipment handler and the product order handler may be configured to periodically receive the product shipment information, and the product order information and the input parameter information via a batch job.

The product order handler may be further configured to receive secondary product order information and secondary input parameter information via an incremental job, and the linear solver may be configured to solve a new constrained linear optimization problem based on results of the constrained linear optimization problem as an initial solution to the new constrained linear optimization problem, and the secondary product order information and the secondary input parameter information.

The job dispatcher configured to create a plurality of jobs based on the product shipment information and the product order information may include arranging the plurality of product orders and the product shipment information into the jobs according to type of product, wherein each job includes product orders and product shipment information of an equivalent type.

The plurality of product orders may include a multiple-type product order having at least one product of a first type and at least one product of a second type, and the job dispatcher may be configured to split the multiple-type product order into a first product order having the at least one product of the first type and a second product order having the at least one product of the second type.

The job dispatcher may include a complexity estimation unit configured to estimate a complexity of each job, and assign the plurality of jobs to a plurality of processors based on the estimated complexity. The plurality of processors may be configured to execute at least a subset of the constrained linear optimization problems corresponding to the plurality of jobs in parallel.

The input parameter information may include a contract delivery day, product amount for a respective product order, unit price, and penalty factors corresponding to a series of shipping dates in relation to the contract delivery day. The constrained linear optimization problem may include an objective function configured to maximize profit or minimize penalties for the product orders within a respective job, where the objective function is subject to one or more constraints. The one or more constraints may include a first constraint requiring that the matched at least one incoming product is less than or equal to a product amount for a respective product order, and a second constraint requiring that the matched at least one incoming product is on stock.

The generating a delivery plan for each product order within a respective job that matches at least one incoming product with a corresponding product order over a period of time may include calculating a delivery amount for at least one of a series of days in relation to a contract delivery date and providing the delivery amount in the delivery plan.

The generating a delivery plan for each product order within a respective job that matches at least one incoming product with a corresponding product order over a period of time may include calculating at least one of a total profit and total penalty for a respective product order and providing at least one of the total profit and the total penalty in the delivery plan.

The embodiments may include a non-transitory computer-readable medium storing instructions that when executed cause one or more processors to match product orders with incoming shipments. The instructions may include instructions to receive product shipment information specifying incoming products, receive product order information specifying a plurality of product orders and input parameter information associated with each product order, create a plurality of jobs based on the product shipment information and the product order information, model each job as a separate constrained linear optimization problem, and solve each constrained linear optimization problem based on the input parameter information and the product shipment information including generating a delivery plan for each product order within a respective job that matches at least one incoming product with a corresponding product order over a period of time.

The instructions to create a plurality of jobs based on the product shipment information and the product order information may include instructions to arrange the plurality of product orders and the product shipment information into the jobs according to type of product, where each job includes product orders and product shipment information of an equivalent type.

The plurality of product orders may include a multiple-type product order having at least one product of a first type and at least one product of a second type, and the instructions to create a plurality of jobs includes instructions to split the multiple-type product order into a first product order having the at least one product of the first type and a second product order having the at least one product of the second type.

The instructions may include instructions to estimate a complexity of each job, assign the plurality of jobs to a plurality of processors based on the estimated complexity, and execute at least a subset of the constrained linear optimization problems corresponding to the plurality of jobs in parallel.

The input parameter information may include a contract delivery day, product amount for a respective product order, unit price, and penalty factors corresponding to a series of shipping dates in relation to the contract delivery day. The instructions to generate a delivery plan for each product order within a respective job that matches at least one incoming product with a corresponding product order over a period of time may include instructions to calculate a delivery amount for at least one of a series of days in relation to a contract delivery date and providing the delivery amount in the delivery plan.

The instructions to generate a delivery plan for each product order within a respective job that matches at least one incoming product with a corresponding product order over a period of time may include instructions to calculate at least one of a total profit and total penalty for a respective product order and provide at least one of the total profit and the total penalty in the delivery plan.

The embodiments may provide a method for matching orders with incoming shipments performed by one or more processors. The method may include receiving, including the one or more processors, product shipment information specifying incoming products, receiving, including the one or more processors, product order information specifying a plurality of product orders and input parameter information associated with each product order, creating, including the one or more processors, a plurality of jobs based on the product shipment information and the product order information, modeling, including the one or more processors, each job as a separate constrained linear optimization problem, and solving, including the one or more processors, each constrained linear optimization problem based on the input parameter information and the product shipment information including generating a delivery plan for each product order within a respective job that matches at least one incoming product with a corresponding product order over a period of time.

The details of one or more implementations are set forth in the accompanying drawings and the description below. Other features will be apparent from the description and drawings, and from the claims.

DETAILED DESCRIPTION

The embodiments provide a mechanism for matching one or more product orders with incoming shipment(s) in order to maximize one or more business values such as revenue, customer satisfaction, and/or number of complete deliveries, and for providing a delivery plan that may specify a delivery amount for a series of days in relation to a contract delivery day, as well as the total profit and/or total penalty for a particular product order. In addition, the embodiments may provide a solution that takes into account partially delivery and/or partial fulfillment situations, as well as optimizes the processing time for computing such a delivery plan. As a result, the embodiments may handle large scale shipping/order matching problems, which are often encountered in the real world. These and other features are further explained below with reference to the figures.

Figure 1:
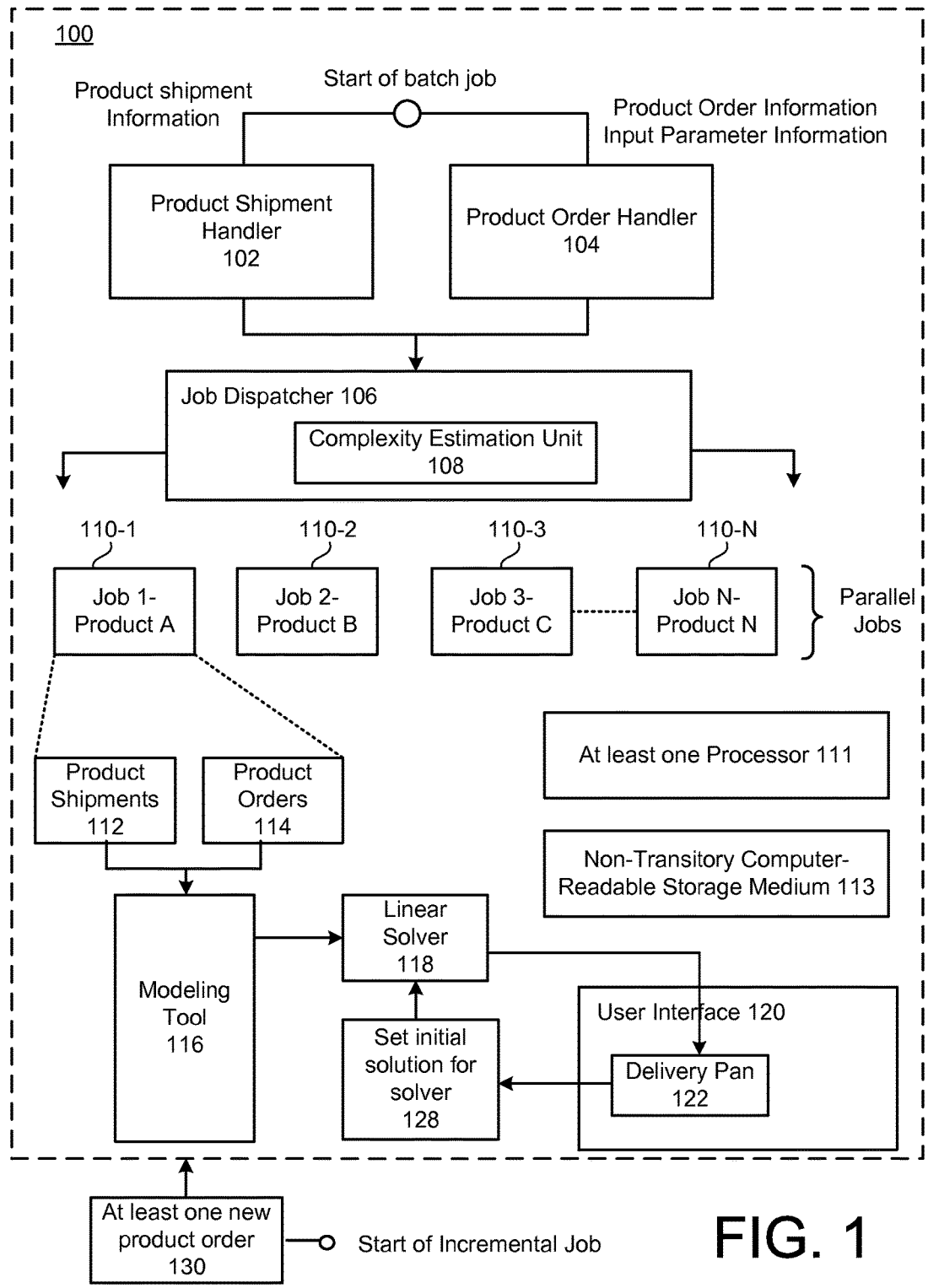
FIG. 1 illustrates a system for matching orders with incoming shipments according to an embodiment.

FIG. 1 illustrates a system 100 for matching orders with incoming shipments according to an embodiment. For example, in response to a start of a batch job, a product shipment handler 102 may receive product shipment information specifying incoming products (shipments), and a product order handler 104 may receive product order information specifying a plurality of product orders and input parameter information associated with each product order.

For example, the system 100 may process the product orders and the incoming shipments according to a number of different ways. In one embodiment, the system 100 may operate in a batch mode, where the system 100 runs periodically. For example, the system 100 may process a batch of product orders and incoming shipments, where the system 100 may divide the problem (e.g., matching incoming shipments with product orders) into sub-problems (e.g., each sub-problem relating to incoming shipments and product orders of an equivalent type), and at least some of the sub-problems may be solved in parallel. Referring to FIG. 1, each sub-problem may relate to a different job 110. As such, the batch of product orders and incoming shipments include jobs 110-1 to 110-N, where N may be any type of integer greater or equal to one. Although the batch mode, typically, will include a plurality of different product orders and incoming shipments, the batch mode may also encompass the situation where only one product order and incoming shipment are evaluated.

In another embodiment, the system 100 may operate in an incremental job mode. For example, after the system 100 processes the batch jobs, at least one new product order 130 may be received by the system 100, and the system 100 processes the one or more new product orders 130 in an incremental way (shown at the bottom of FIG. 1). The results of the previous batch job may be utilized as an initial solution for the new solution in order to reduce the computation time. For instance, a good estimation of the initial solution may lead to fast convergence for the subsequent solution of an iterative solver, which may be employed for solving each job 110. Accordingly, the system 100 may utilize an iterative approach for solving the new solution based on the results of the previous solution. Therefore, the system 100 may use the solution of the batch scenario as the initial solution to reduce the computation time needed for the incremental mode. The disclosure will explain the batch mode processing first, and the incremental mode processing is further discussed at the bottom of FIG. 1 with reference to the at least one new product order 130. For example, the at least one new product order 130 of FIG. 1 may represent the one or more product orders to be evaluated in the incremental mode.

The product shipment information may include information that indicates the incoming products, e.g., the products that are scheduled to be delivered to the company. The product shipment information may identify the type of products, the number of products, and/or the shipping date(s) for which the products are to be shipped (or received). Also, the product shipment information may identify the shipper, the mode of transportation, and/or the price paid for the incoming shipments, for example.

In one embodiment, the product shipment handler 102 may receive product shipment information specifying incoming products (shipments) from a database that stores the product shipment information. For example, in the course of ordering new products for the company's stock or inventory, the relevant product shipment information may be entered within a product shipment database. The product shipment information database may be a database associated with the system 100 or another system in communication with the system 100. Then, when the system 100 runs, the product shipment handler 102 may obtain the relevant product shipment information. For example, for executing a batch job, the product shipment handler 102 may obtain the relevant product shipment information according to one or more batch job parameters. In one example, the batch job parameters may allow the user to set the time period of when the system 100 processes the batch jobs. As such, the product shipment hander 102 may obtain the relevant product shipment information according to the time period specified by the batch job parameters. In addition, with respect to the incremental job, the product shipment handler 102 may be configured to obtain the product shipment information according to the incremental job parameters, which may provide an update or revised time period for processing the jobs 110.

The product order information may include information regarding one or more product orders, where each product order specifies one or more products that have been ordered by a customer. For example, a product order may refer to an order submitted by a customer for the purchase of one or more products from a company associated with the system 100, and may be identified by a product order reference number. The one or more products included within each product order may include virtually any type of product that can be purchased, which may be too numerous to list, but generally may include physical goods such as electronic products and/or virtual goods such as software packages, for example. The product order information may identity the product orders (and possibly the customer), as well as the type of ordered products, the quantity, and the contract delivery date (e.g., date of delivery required by the customer) for each product order. In addition, the product order information may include information indicating whether partial delivery and/or partial fulfillment is permitted, and information providing one or more conditions on partial delivery and/or partial fulfillment situations such as the minimum amount permitted for partial delivery and/or partial fulfillment situations and any associated penalties. For example, the product order itself may indicate whether the buyer permits partial delivery and/or partial fulfillment, and any conditions associated with the partial delivery and/or partial fulfillment situations. Alternatively, the system 100 may access a database that stores information associated with a customer account, and the customer account may indicate whether the buyer permits partial delivery and/or partial fulfillment.

The input parameter information may include some of the information from the product order information, as well as some additional parameters, which the system 100 may utilize to match the incoming shipments with the product orders, as further explained below. Essentially, the input parameter information may include the information utilized by a linear solver 118 for executing each job 110. For example, the input parameter information may include a series of parameters for each product order. In particular, for each product order, the input parameter information may include a contract delivery date, a total amount of the product order, a series of shipping dates in relation to the contract delivery date, penalty factors for the series of shipping dates, and the unit price of the ordered products.

The product order handler 104 may receive the product order information specifying a plurality of product orders and the input parameter information associated with each product order. In one embodiment, the product order handler 104 may receive the product order information and the input parameter information from a database that stores product orders from customers and associated parameter information. For example, in the course of receiving new product orders from the company's customers, the relevant product order information/input parameter information may be entered within a product order database. The product order database may be a database associated with the system 100 or another system in communication with the system 100. Then, when the system 100 runs, the product order handler 104 may obtain the relevant product order information and the input parameter information from the product order database. Also, the product order handler 104 may obtain the product order information and the input parameter information from a number of different databases that stores such information.

For executing a batch job, the product order handler 104 may obtain the relevant product order information and the input parameter information according to the one or more batch job parameters. In one example, as indicated above, the batch job parameters may allow the user to set the time period of when the system 100 runs the batch jobs. As such, the product order handler 104 may obtain the relevant product order information and the input parameter information according to the time period specified by the batch job parameters. In addition, with respect to the incremental job, the product order handler 104 may be configured to obtain the product order information and the input parameter information for the at least one new product order 130 according to the incremental job parameters, which may provide an update or revised time period for processing the jobs 110 and/or indicate the at least one new product order 130 to be evaluated.

Figure 2:
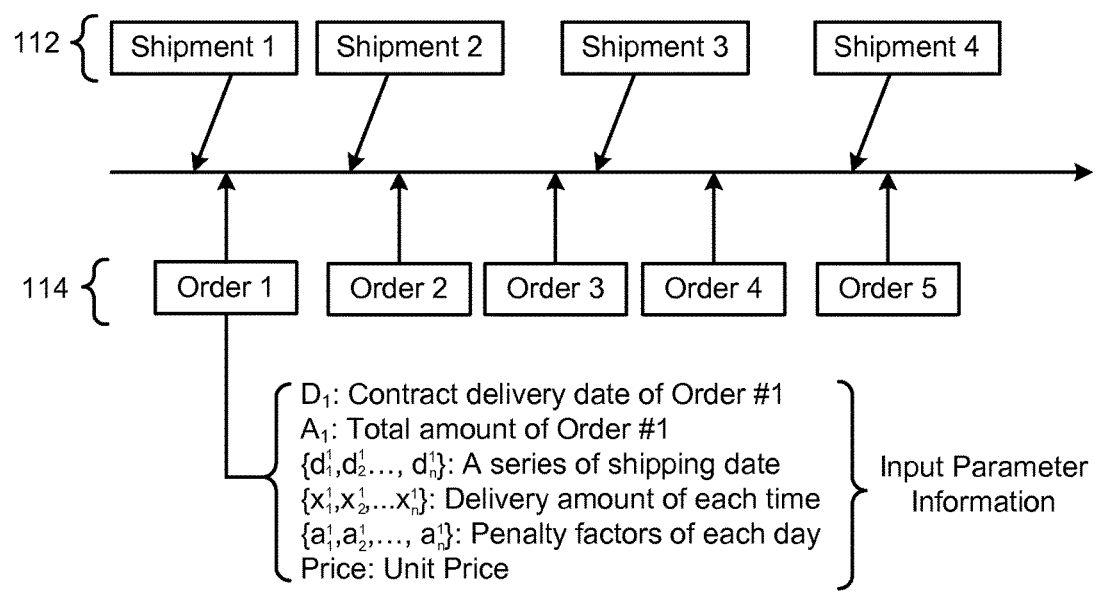
FIG. 2 illustrates a plurality of incoming shipments and product orders on a timeline and the input parameter information for a first product order of the system of FIG. 1 according to an embodiment.

FIG. 2 illustrates a plurality of product shipments 112 and product orders 114 on a timeline, and the input parameter information for a first product order according to an embodiment. For example, referring to FIG. 2, the timeline depicts the plurality of product shipments 112 (shipment 1 to shipment 4) and the plurality of product orders 114 (order 1 to order 5) according to the shipment arrival dates and contact delivery dates, respectively. With respect to the order 1, the input parameter information may include the contract delivery date of order 1 ($D_1$), the total amount of order 1 ($A_1$), a series of shipping dates ($d^I_1, d^I_2, \ldots, d^I_n$), a delivery amount for each shipping date ($x^I_1, x^I_2, \ldots, x^I_n$), penalty factors of each shipping date ($a^I_1, a^I_2, \ldots, a^I_n$), and the unit price (Price). The parameter 1 may indicate set of product orders 114 in the batch, e.g., in this case, the parameter 1 would be 5.

The values for the penalty factors ($a^I_1, a^I_2, \ldots, a^I_n$) are provided if partial fulfillment or partial delivery is permitted, and may reflect the penalty associated with shipping one or more products on one or more of a series of shipping dates in relation to the contract delivery date ($D_1$). In other words, the penalty factors ($a^I_1, a^I_2, \ldots, a^I_n$) may represent a set of penalty treatments, that is, if the seller cannot deliver the products on time, how much penalty the seller will pay for the fine. For instance, if the products can be shipped on the contract delivery date ($D_1$), the penalty factor may be zero. However, if one or more products are shipped one day after the contact delivery date ($D_1$), then the penalty factor may be a specified value. If one or more products are shipped two days after the contact delivery date ($D_1$), the penalty factor may be the same specified value as the penalty factor for a one-day delay, or a higher penalty value. In one example, the penalty factors ($a^I_1, a^I_2, \ldots, a^I_n$) may increase as the shipping dates ($d^I_1, d^I_2, \ldots, d^I_2$) are further away from the contract delivery date ($D_1$). For example, the series of penalty factors ($a^I_1, a^I_2, \ldots a^I_n$) may provide an increasing penalty treatment.

The unit price is the price in terms of a product unit, which, in one example, the system 100 may assume that the transactional price of the same type of product will vary in different product orders. The total amount ($A_1$) may be the total amount of the product order. If this amount cannot be satisfied, this may be the case of partial fulfillment, and if the seller has to deliver the products goods by multiple shipping dates, this may be the case of partial delivery. Also, the input parameter information and/or the product order information may specify if partial fulfillment is allowed or not and the penalty term associated with partial fulfillment, and if partial delivery is allowed or not and the penalty term associated with the partial delivery.

The series of shipping dates ($d^I_1, d^I_2, \ldots, d^I_n$) may be the days the products are possibly shipped to the customer in accordance with the product order with products that have been matched with the incoming shipments. For instance, the series of shipping dates ($d^I_1, d^I_2, \ldots, d^I_n$) may be a set of possible dates in relation to the contract delivery date ($D_1$) for which the delivery amount ($x^I_1, x^I_2, \ldots, x^I_n$) for these days are evaluated by the system 100. As further explained below, the system 100 may solve for the value of the delivery amount for each shipping date ($x^I_1, x^I_2, \ldots, x^I_n$) within a constrained linear optimization problem. For instance, the actual value for the delivery amount for each shipping date ($x^I_1, x^I_2, \ldots, x^I_n$) is solved by the system 100 in order to maximize profit and/or minimize the penalty. According to one example, the delivery amount for a particular product order may be 100, 0, 0, and 100, which means that 100 products may be shipped on the contract delivery date, 0 products on the next two subsequent days, and then 100 products on the third day from the contract delivery date. This example delivery schedule would indicate that the customer who submitted this purchase order allows for partial delivery, and that only 100 products can be delivered on time with the other 100 products being delivered with a delay having an associated penalty factor. The input parameter information may be characterized in the same manner for product orders 2-5.

Referring back to FIG. 1, the product shipment information received by the product shipment handler 102, and the product order information and the input parameter information received by the product order handler 104 are provided to a job dispatcher 106. The job dispatcher 106 may be configured to create a plurality of jobs 110 based on the product shipment information and the product order information. The plurality of jobs 110 may include a first job 110-1, a second job 110-2, and a third job 110-3 through N job 110-N, where N may be any integer.

According to one embodiment, the job dispatcher 106 may be configured to arrange the product orders of the product order information and the incoming shipments of the product shipment information into the jobs 110 according to type of product, where each job 110 includes the product orders 114 and the product shipments 112 of an equivalent type. For example, the first job 110-1 may include the product shipments 112 and the product orders 114 relating to product A. In other words, the first job 110-1 includes all the product shipments 112 and all the product orders 114 in the batch job relating to products of type A. Similarly, the second job 11-2 includes the product shipments 112 and the product orders 114 relating to products of type B, the third job 110-3 includes the product shipments 112 and the product orders 114 relating to products of type C, and so on until job N 110-N relating to type N products. As such, the job dispatcher 106 creates the plurality of jobs 110 such that each job 110 includes the product shipments 112 and the product orders 114 relating to products of an equivalent type.

Generally, a buyer will order several types of products at one time, e.g., within a single product order. According to the embodiments, the multi-product order may be split into several sub-orders where there is only one type of product for each sub-order. It is noted that in real business practice, the delivery schedule of one product will not affect other products. As such, if the product orders from the product order information include a multiple-type product order having at least one product of a first type and at least one product of a second type, the job dispatcher 106 may be configured to split the multiple-type product order into a first product order having the at least one product of the first type and a second product order having the at least one product of a second type. For example, for multiple-type product orders (e.g., product orders having two or more types of products), the job dispatcher 106 may break apart the product orders, and create virtual product orders such that each virtual product order includes products of the same type. Accordingly, the job dispatcher 106 ensures that each product order within a job 110 relates to products of the same type. As such, the job dispatcher 106 may group all the product orders (regular and virtual) having the same type of products into a job 110 and may associate the appropriate product shipments to the job 110.

Referring to FIG. 1, the system 100 may include at least one processor 111 and a non-transitory computer-readable storage medium 113 including instructions executable by the at least one processor 111, where the instructions may be configured to implement the functionalities of the system 100 discussed herein as shown with respect to the components of the figures, as well as any other functionalities of the system 100 discussed herein. The non-transitory computer-readable storage medium 113 may include one or more non-volatile memories, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Besides storing executable instructions, the non-transitory computer-readable storage medium 113 may also store any type of database structure discussed herein as such as the product order database and the product shipment database. The at least one processor 111 may include any type of special purpose logic circuitry, e.g., an FPGA (field programmable gate array) or an ASIC (application-specific integrated circuit).

Figure 5:
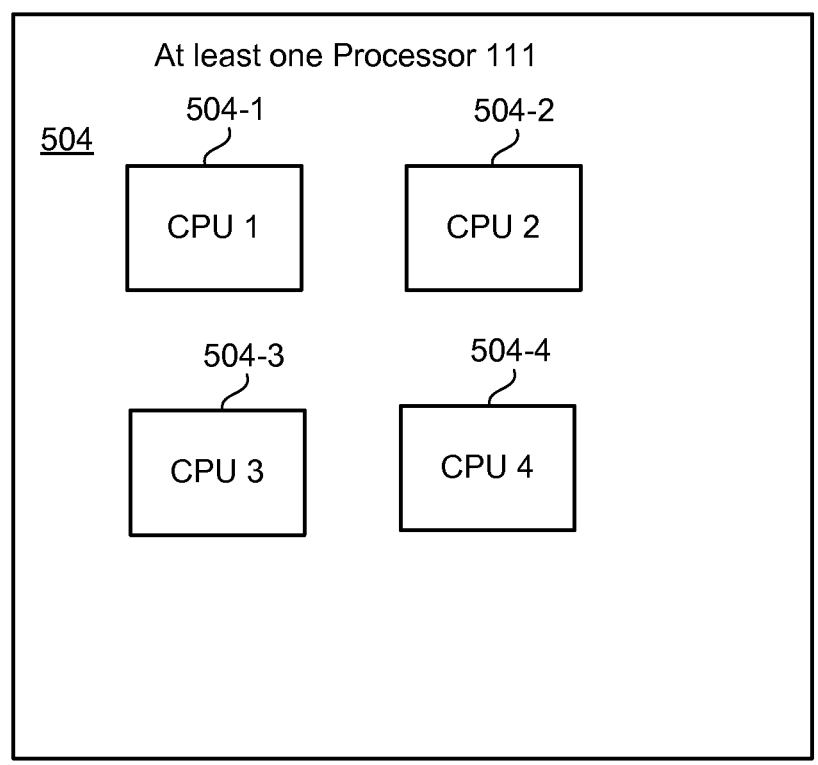
FIG. 5 illustrates a plurality of computer processing units (CPUs) for executing the jobs in a parallel manner according to an embodiment.

The job dispatcher 106 may include a complexity estimation unit 108 that may be configured to estimate a complexity of each job, and assign the plurality of jobs to a plurality of processors based on the estimated complexity. For example, the at least one processor 111 may include a plurality of processors such as the computer processing units (CPUs) as shown in FIG. 5 and discussed later in the disclosure. As further discussed below, a modeling tool 116 may be configured to model each job 110 as a separate constrained linear optimization problem, and a linear solver 118 may be configured to solve each constrained linear optimization problem corresponding to a respective job 110 based on the input parameter information and the product shipment information. According to the embodiments, the complexity estimation unit 108 may be configured to estimate the complexity of solving the constrained linear optimization problem corresponding to a particular job 110, and then based on the estimated complexity, assign the job 110 to an appropriate processor among the plurality of CPUs. In one embodiment, the complexity estimation unit 108 may estimate a computation time for processing each job 110 (or each constrained linear optimization problem). Then, the complexity estimation unit 108 may estimate the complexity for each job 110, and assign each job 110 to the plurality of processors in a manner that permits parallel execution of at least some of the plurality of jobs 110 (or all of them). The estimation and assignment of jobs 110 are further explained later in the disclosure with reference to FIGS. 5-6.

The constrained linear optimization problem may include an objective function configured to maximize profit or minimize penalties for product order(s) of a corresponding job 110, where the objective function is subject to one or more constraints, as further discussed below. Also, besides profit and penalties, the objective function may be structured to maximize or minimize other types of business values such as the number of complete deliveries, for example. For instance, by employing the principles discussed herein, one of ordinary skill in the art may design the objective function according to any type of business value which is desired.

In one embodiment, the modeling tool 116 may utilize constrained linear optimization principles to model a particular job 110 as a constrained linear optimization problem, and the linear solver 118 may solve the constrained linear optimization problem using an iterative method. In one embodiment, the linear solver 118 may be configured to continuously process the optimization problem, where the linear solver 118 may be configured to round the output to an integer for the shipping problem.

In order to achieve the desired outcome (e.g., maximum profit or lowest delay penalty), the linear solver 118 may be configured to compute the percentage (or the amount) of the products for a particular product order that should be delivered each day. In one example, the linear solver 118 may utilize linear programming to compute the delivery percentage (or amount) and transportation time for each product order within the jobs 110. Generally, linear programming is a method for determining a way to achieve the desired outcome in a given mathematical model for a list of requirements represented as linear relationships. In the partial delivery situation, profit and penalty have linear relationships with the delivery percentage (or amount) of the product order. Therefore, the partial delivery/partial fulfillment situations can be characterized as a linear programming problem.

More formally, linear programming is a technique for the optimization of a linear objective function, subject to linear equality and linear inequality constraints. A feasible region of the linear objective function is a convex polyhedron, which is a set defined as the intersection of finite half spaces, each of which is defined by a linear inequality. The objective function is a real-valued affine function defined on this polyhedron. A linear programming algorithm finds a point in the polyhedron where this function has the smallest (or largest) value if such point exists.

The canonical form of linear programming can be expressed as follows:

$$\text{Minimize/Maximize } C^T x \text{ Subject to } Ax \leq b \text{ and } Ax \geq 0, \quad \text{Eq. (1)}$$

where the parameter x may represent the vector of variables to be determined, and C and b are vectors of known coefficients, the parameter A is a known matrix of coefficients, and $^T$ is the matrix transpose. The first expression $C^T x$ to be maximized or minimized is referred to as the objective function. As indicated above, the objective function for matching product orders with incoming shipments may be maximized or minimized according to at least one of a plurality of business values such as profit or penalty. According to the embodiment, while taking account the delay penalty (which is required by partial delivery/partial fulfillment situations), the profit for a particular product order$_i$ may be calculated based on:

$$\text{profit}_i = \text{revenue}_i - \text{penalty}_i, \text{ where } \text{revenue}_i = \text{price}_i *$$
$$(x^i_1 + x^i_2 + x^i_3 + \ldots + x^i_n), \text{ and } \text{penalty}_i = a^i_1(D_i - d^i_1)$$
$$x^i_1 + a^i_2(D_i - d^i_2)x^i_2 + \ldots + a^i_n(D_1 - D^i_n)x^i_n. \quad \text{Eq. (2)}$$

In Eq. (2), the revenue$_i$ is the revenue of product order$_i$, and the penalty$_i$ is the penalty of product order$_i$. The parameters $x^i_j$ and $d^i_j$ are the delivery amounts and shipping dates, respectively, for the product order$_i$ at time j. The parameter $D_i$ is the contract delivery date for the product order$_i$. As such, $D_i - d^i_j$ may represent the variation between actual delivery date and the contract delivery date, and $a^i_j$ is the corresponding unit penalty for product order$_i$ at time j.

Then, the modeling tool 116 may define the object function, which takes into account the partial delivery situation, as follows:

$$\sum_{i \in I} \text{profit}_i = \quad \text{Eq. (3)}$$

$$\sum_{i \in I} \text{revenue}_i - \text{penalty}_i = \sum_{i \in I} \sum_{j=1}^{n} (\text{price}_i - \alpha^j_i(D_i - d^i_j))x^i_j$$

The parameter n is the largest possible delay for the product orders. In this example, the partial delivery situation can be transformed into a problem of maximizing the profit by choosing optimal values for all $x^i_j$ (which are the delivery amounts for a series of shipping days). The inequalities $Ax \leq b$ are the constraints which specify a convex polytope over which the objective function is to be optimized. In this example, for each product order, there is a constraint $x^i_1 + x^i_2 + \ldots + x^i_n \leq A_i$, where $A_i$ is the total amount of the product order$_i$. Meanwhile, at any time, goods delivered should not exceed current available stock (e.g., the amount of goods which current shipments provide).

Next, the modeling tool 116 may convert the object function into a linear programming problem. For example, a standard linear programming problem may include four parts. The first part includes a linear function to be maximized, e.g., $f(x_1,x_2)=c_1x_1+c_2x_2$, the second part includes the problem constraints, e.g., $a_{11}x_1+a_{12}x_2 \leq b_1$, $a_{21}x_1+a_{22}x_2 \leq b_2$, $a_{31}x_1+a_{32}x_2 \leq b_3$, the third part includes the non-negative variables, e.g. $x_1 \geq 0$, $x_2 \geq 0$, and the four part includes the non-negative right hand side constraints, e.g. $b_i \geq 0$, where i=1, 2, 3.

According to the embodiments, the modeling tool 116 may convert the object function (e.g. Eq. (3)) into a constrained linear optimization problem, which is illustrated in Eq. (4) and Eq. (5) below.

For example, the constrained linear optimization problem may include an objective function that is configured to maximize profit or minimize penalties, where the constrained linear optimization problem may be subject to one or more constraints, as shown in Eq. (4).

$$\sum_{i \in I} \sum_{j=1}^{n} (price_i - \alpha^j_j(D_i - t^j_j))x^j_j \quad \text{Eq. (4)}$$

being subjects to the following constraints:
First Constraint: $0 \leq x_1^i + x_2^i + \ldots + x_n^i \leq A_i, \forall i \in I$
Second Constraint: $0 \leq \sum_{i=1}^{j} \sum_{i \in I} x_j^i \leq Stock_j, 1 \leq j \leq n$
Third Constraint: $x_j^i \geq 0, \forall x_j^i, i \in I, 0 \leq j \leq n$
Fourth Constraint: $A_i \geq 0, \forall_{i \in I}$ The first constraint may require that the matched incoming products is less than or equal to the total product amount ($A_i$) for a particular product order. For example, as indicated above, the parameter $A_i$ is the total amount for the product order$_i$, and the parameter $x_j^i$ refers to the amount to be delivered for a series of shipping days. In other words, the parameter $x_j^i$ may represent the delivery plan that matching incoming shipments with product orders. As such, the combined delivery amount for the series of shipping days should be less than the total amount for the product order. In addition, the combined delivery amount for the series of shipping days should be greater than or equal to 0, e.g., a non-negative number.

The second constraint requires that the matched incoming products are on stock. For example, the parameter $Stock_j$ is the stock of the product in time j. The $Stock_j$ may be defined as follows:

$$Stock_j = \sum_{j=1}^{J} Shipment - \sum_{j=1}^{J} \sum_{i \in I} x_t^j \quad \text{Eq. (5)}$$

The products on stock may be defined as the total number of incoming shipments for a particular type of product minus the total amount of products that are assigned to product orders, e.g., the delivery amount for a series of shipping days. As such, the matched incoming products (e.g., the incoming shipments that have been assigned to product order(s)) should be less than or equal to the products on stock, as defined by Eq. (5). The third and fourth constraints are constraints that are common to all (or most) linear programming problems, therefore, the details of these constraints are omitted for the sake of brevity because the third and fourth constraints are well known to one of ordinary skill in the art.

Referring to FIG. 1, the modeling tool 116 may be configured to model each job 110 as a separate constrained linear optimization problem, e.g., Eqs. (4) and (5). Then, the linear solver 118 may be configured to solve each constrained linear optimization problem based on the input parameter information and the product shipment information including generating a delivery plan for each product order within a respective job that matches one or more incoming products with a corresponding product order over a period of time. For example, the linear solver 118 may receive the input parameter information, which may include the contract delivery date of product order ($D_1$), the total amount of order 1 ($A_1$), a series of shipping dates ($d^I_1, d^I_2, \ldots d^I_n$), a delivery amount for each shipping date ($x^I_1, x^I_2, \ldots, x^I_n$), penalty factors of each shipping date ($a^I_1, a^I_2, \ldots, a^I_n$), and/or the unit price (Price). The product shipment information may include the parameter Shipment$_t$, which may represent the type of products, the number of products, and/or the shipping date(s) for which the products are to be shipped (or received). Using the input parameter information and the product shipment information, the linear solver 118 may solve for the delivery amount for each shipping date ($x^I_1, x^I_2, \ldots, x^I_n$) based on Eqs. (4) and (5) using an iterative method. For instance, the linear solver 118 may continuously solve Eqs. (4) and (5) until the determined values for $x^I_1, x^I_2, \ldots, x^I_n$ converge to a final solution, and then the linear solver 118 may round the solution to an integer value for each determined shipping day.

As such, the linear solver 118 may generate a delivery plan 122 for each product order within a respective job 110. In one example, the delivery plan 122 may specify a delivery amount for a series of days in relation to the contract delivery day of the product order. Further, the delivery plan 122 may provide the total profit of the product order, and/or the total penalty for the respective product order. For instance, in the case of partial delivery/partial fulfillment situations, the total profit may be dependent on whether the ordered products can be delivered to the customer as specified by the contract delivery day. As such, if a portion of the products (or all of them) are delivered after the contact delivery day, the total profit may reflect the loss of profit due to the penalty, as defined by penalty factors, $a^I_1, a^I_2, \ldots, a^I_n$.

Referring to FIG. 1, a user interface 120 may provide the delivery plan 122 to the user such that the user can evaluate the profitability of each product order. For instance, the user interface 120 may permit the user to view the delivery plan 122 for each product order within a job 110. As such, the user may select a particular job 110 in order to view the delivery plans 122 for the product orders associated with a particular type of product.

Figure 3:
FIG. 3 illustrates a delivery plan generated by the system of FIG. 1 according to an embodiment.

FIG. 3 illustrates a delivery plan 122 generated by the system 100 according to an embodiment. It is noted that the delivery plan 122 may include a delivery plan for one or more product orders. According to one example, the delivery plan 122 may correspond to one particular job 110, which relates to the same type of products. Therefore, the delivery plan 122 may include one or more product orders relating to the same type of products. Also, the delivery plan 122 may provide the delivery plan for product orders that were processed in different jobs 110, which would include different types of products. In either case, the delivery plan for each product order provides a shipping amount 306 for a series of shipping days (e.g., $(x^i_1, x^i_2, \ldots, x^i_n)$) on a timeline of increasing delay 304 in relation to a contract delivery date 302. The contract delivery date 302 may represent the calendar date of a month (e.g., the $3^{rd}$), or a number of days from the current day (e.g., 3 days from the current day).

In the example of FIG. 3, the delivery plan 122 provides a delivery plan for a plurality of product orders, e.g., order #1 to order #5. In this example, it is assumed that the overall shipping amount (e.g., quantity) for each product order is 200. However, the product orders in the delivery plan 122 may specify different overall shipping amounts, e.g., the product orders in the delivery plan 122 do not necessarily have to reflect the same quantity or type of product. Also, the delay 304 may provide the delay of the ordered product in relation to the contact delivery date 302. For example, the delay of zero indicates that the ordered products can be delivered on or before the contact delivery date 302. The timeline of the delay 304 may provide the delay according to calendar day, e.g., each time slot after the zero timeslot indicates a delayed calendar day. Also, it is noted that the delivery plan 122 of FIG. 3 is merely example, where the embodiments encompass any type of visual arrangement of a delivery plan 122 that matches one or more incoming products with a product order. In the example of FIG. 3, the delivery plan 122 may indicate whether a product order can be fulfilled by the contract delivery date 302 (e.g., if all the ordered products are specified in the zero time slot). However, the embodiments may also provide a delivery plan 122 that can specify the actual dates (or time period) before the contract delivery date 302 for which the ordered products can be delivered. Further, the delay 304 does not necessarily have to reflect the delay in terms of calendar days, where it can represent any type of delay over a period of time, e.g., each time slot representing a week, month, year, etc.

With respect to order #1, the contact delivery is the $3^{rd}$, and the delivery plan 122 corresponding to the order #1 indicates that all 100 of the ordered products in the product order can be delivered with no delay. Therefore, order #1 is neither a partial delivery nor partial fulfillment situation, and the products can be delivered before the specified contact delivery date 302.

With respect to product order #2, the delivery plan 122 corresponding to the order #2 indicates that 100 products of the product order can be delivery with no delay in relation to the contact delivery date 302 of the $7^{th}$, but the rest of the order #2 (100) will be delivered with a delay of four days after the contact delivery date 302 of the $7^{th}$. For instance, the order #2 may be a product order permitting partially delivery with a portion of the products being delivered with no delay, and another portion of the products being delivered with a delay of four days.

Orders #3, #4 and #5 are examples of a partial fulfillment situation, which will also be associated with a delay penalty. For example, the delivery plan 122 corresponding to the order #3 indicates that 50 products can be delivered before the contract delivery date 302 of the $9^{th}$, and 100 products can be delivered with a delay 304 of 6 days in relation to the contract delivery date 302 of the $9^{th}$. Since the product order is for 200 products, the delivery plan 122 indicates that the total quality for the product order cannot be fulfilled at this time. The delivery plan 122 corresponding to the order #4 indicates that 180 products can be delivered before the contract delivery date 302 of the $11^{th}$, and the delivery plan 122 corresponding to the order #5 indicates that 120 products can be delivered before the contract delivery date 302 of the $15^{th}$. Similar to order #3, the order #4 and the order #5 cannot be fulfilled at this time.

As indicated above, besides providing the shipping amount for a series of shipping dates in relation to the contact delivery date 302, the delivery plan 122 for each product order may specify the total profit and/or the total penalty for a respective product order. For example, the linear solver 118 may obtain the total penalty and/or the total penalty from Eqs. (4) and (5), and provide this information in the delivery plan 122, which may be provided to the user on the user interface 120.

Referring back to FIG. 1, as indicated above, the system 100 may operate in an incremental mode. For instance, the modeling tool 116 may receive at least one new product order 130 in response to a start of an incremental job. In this example, the product order handler 104 may receive secondary product order information and secondary input parameter information via an incremental job. The secondary product order information may indicate the at least one new product order 130 and the secondary input parameter information may indicate the associated parameter information as explained above. The job dispatcher 106 may then assign the new product order(s) 130 to the appropriate jobs 110, e.g., by type of product. Then, the linear solver 118 may solve a new constrained linear optimization problem based on the results of the previous constrained linear optimization problem, the secondary product order information, and the secondary input parameter information. For example, as shown on FIG. 1, the system 100 may set the initial solution for the current job using the results of the previous job (e.g., the delivery plan 122). In particular, the linear solver 118 may use the results (e.g., the values for the delivery amounts (e.g., $(x^i_1, x^i_2, \ldots, x^i_n)$) as the associated total profit/penalty, as the initial solution, and then calculate new values for the series of delivery amounts (e.g., $(x^i_1, x^i_2, \ldots, x^i_n)$) as well as the associated total profit/penalty based on, in part, the secondary product order information, the secondary input parameter information. Then, the linear solver 118 may provide the updated delivery plan 122 for display on the user interface 120.

Figure 4:
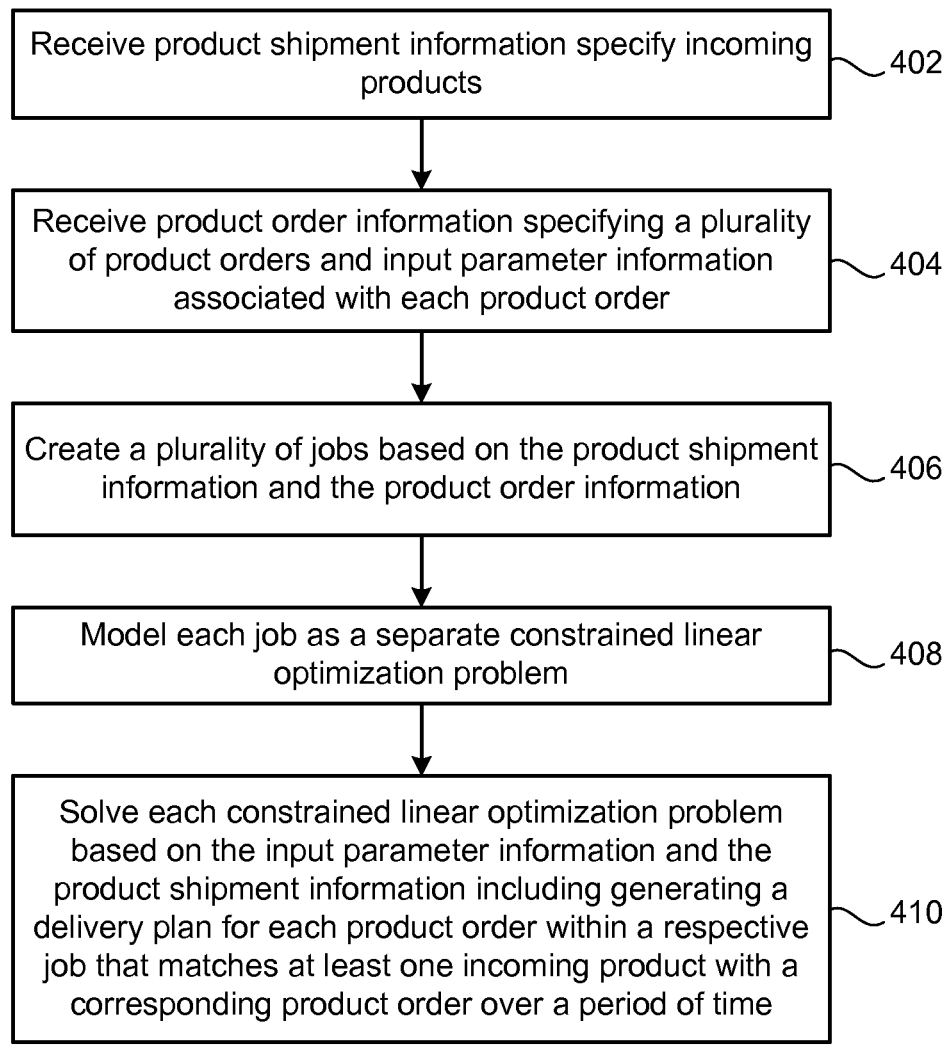
FIG. 4 is a flowchart illustrating example operations of the system of FIG. 1 according to an embodiment.

FIG. 4 is a flowchart illustrating example operations of the system 100 of FIG. 1 according to an embodiment. Although FIG. 4 is illustrated as a sequential, ordered listing of operations, it will be appreciated that some or all of the operations may occur in a different order, or in parallel, or iteratively, or may overlap in time.

Product shipment information specifying incoming products may be received (402). For example, the product shipment handler 102 may receive product shipment information specifying incoming products (shipments). The product shipment information may include information that indicates the incoming products, e.g., the products that are scheduled to be delivered to the company. The product shipment information may identify the type of products, the number of products, and/or the shipping date(s) for which the products are to be shipped (or received). Also, the product shipment information may identify the shipper, the mode of transportation, and/or the price paid for the incoming shipments, for example.

Product order information specifying a plurality of product orders and input parameter information associated with each product order may be received (404). The product order information may include information regarding one or more product orders, where each product order specifies one or more ordered products. For example, the product order information may identity the product orders (and possibly the customer), as well as the type of ordered products, the quantity, and the contract delivery date (e.g., date of delivery required by the customer) for each product order. In addition, the product order information may include information indicating whether partial delivery and/or partial fulfillment is permitted, and information providing one or more conditions on partial delivery and/or partial fulfillment situations such as the minimum amount permitted for partial delivery and/or partial fulfillment situations and any associated penalties.

The input parameter information may include some of the information from the product order information, as well as some additional parameters, which the system 100 utilizes to match the incoming shipments with the product orders. For example, the input parameter information may include a series of parameters for each product order in the product order information. In particular, for each product order, the input parameter information may include a contract delivery date, a total amount of the product order, a series of shipping dates in relation to the contract delivery date, penalty factors for the series of shipping dates, and the unit price. The input parameter information is further illustrated with respect to FIG. 2. For example, referring to FIG. 2, the input parameter information may include the contract delivery date of order 1 ($D_1$), the total amount of order 1 ($A_1$), a series of shipping dates ($d^I_1, d^I_2, \ldots, d^I_n$), a delivery amount for each shipping date ($x^I_1, x^I_2, \ldots, x^I_n$), penalty factors of each shipping date ($a_1, a^I_2, \ldots a_n$), and the unit price (Price). The parameter/ indicates that the set of product orders in the batch.

Also, the product shipment information, the product order information, and the input parameter information may be received periodically via a batch job. The batch job provides a plurality of product orders and associated shipment and input parameter information to the system 100 for evaluation. Then, the system 100 evaluates and provides a delivery plan 122 for each of the product orders within the batch job. Also, the system 100 may operate in an incremental mode, where the product order handler 104 may be configured to receive secondary product order information and secondary input parameter information via the incremental job. The system 100 may be configured to re-evaluate the results of the batch mode using the previous results and the newly received information.

A plurality of jobs may be created based on the product shipment information and the product order information (406). For example, the product shipment information received by the product shipment handler 102, and the product order information and the input parameter information received by the product order handler 104 are provided to the job dispatcher 106. The job dispatcher 106 may be configured to create a plurality of jobs 110 based on the product shipment information and the product order information. The plurality of jobs 110 may include a first job 110-1, a second job 110-2, and a third job 110-3 through N job 110-N, where N may be any integer.

According to one embodiment, the job dispatcher 106 may be configured to arrange the product orders of the product order information and the incoming shipments of the product shipment information into the jobs 110 according to type of product, where each job 110 includes product orders and product shipment information of an equivalent type. For example, the first job 110-1 may include the product shipments 112 and the product orders 114 relating to product A. In other words, the first job 110-1 includes all the product shipments 112 and all the product orders 114 in the batch job relating to products of type A. Similarly, the second job 11-2 includes the product shipments 112 and the product orders 114 relating to products of type B, the third job 110-3 includes the product shipments 112 and the product orders 114 relating to products of type C, and so on until job N 110-N relating to type N products. As such, the job dispatcher 106 creates the plurality of jobs 110 such that each job 110 includes the product shipments 112 and the product orders 114 relating to products of an equivalent type.

Each job may be modeled as a separate constrained linear optimization problem (408). For example, the modeling tool 116 may be configured to model each job 110 as a separate constrained linear optimization problem. The constrained linear optimization problem may include an objective function that is configured to maximize profit or minimize penalties, where the objective function is subject to one or more constraints, as shown in Eqs. (4) and (5).

Each constrained linear optimization problem may be solved based on the input parameter information and the product shipment including generating a delivery plan for each product order within a respective job that matches at least one incoming product with a corresponding product order over a period of time (410). For example, the linear solver 118 may be configured to solve each constrained linear optimization problem based on the input parameter information and the product shipment information including generating a delivery plan for each product order within a respective job that matches one or more incoming products with a corresponding product order over a period of time.

For example, the linear solver 118 may receive the input parameter information, which may include the contract delivery date ($D_1$), the total amount of order 1 ($A_1$), a series of shipping dates ($d^I_1, d^I_2, \ldots d^I_n$), a delivery amount for each shipping date ($x^I_1, x^I_2, \ldots, x^I_n$), penalty factors of each shipping date ($a^I_1, a^I_2, \ldots, a^I_n$), and/or the unit price (Price). The product shipment information may include the parameter Shipment$_i$, which may represent the type of products, the number of products, and/or the shipping date(s) for which the products are to be shipped (or received). Using the input parameter information and the product shipment information, the linear solver 118 may solve for the delivery amount for each shipping date ($x^I_1, X^I_2, \ldots, x^I_n$) based on Eqs. (4) and (5) using an iterative method. For instance, the linear solver 118 may continuously solve Eqs. (4) and (5) until the determined values for $x^I_1, x^I_2, \ldots, x^I_n$ converge to a final solution, and then the linear solver 118 may round the solution to an integer value for each determined delivery amount.

As such, the linear solver 118 may generate a delivery plan 122 for each product order within a respective job 110. In one example, the delivery plan 122 may specify a delivery amount for a series of days in relation to the contract delivery day of the product order. Further, the delivery plan 122 may provide the total profit and/or the total penalty for the respective product order. For instance, in the case of partial delivery/partial fulfillment situations, the total profit may be dependent on whether the ordered products can be delivered to the customer as specified by the contract delivery day. As such, if a portion of the products (or all of them) are delivered after the contact delivery day, the total profit may reflect the loss of profit due to the penalty, as defined by penalty factors, $a^I_1, a^I_2, \ldots, a^I_n$.

Referring back to FIG. 1, as explained above, according to one embodiment, the job dispatcher 106 may include the complexity estimation unit 108, which may be configured to estimate a complexity of each job 110, and assign the plurality of jobs 110 to a plurality of processors based on the estimated complexity, where at least a subset (or all) of the jobs 110 are executed in parallel. For instance, the plurality of processors may solve at least a portion (or all) of the constrained linear optimization problems corresponding to the jobs 110 in parallel according to a parallelism method, as further explained below.

FIG. 5 illustrates the at least one processor 111 having a plurality of computer processing units (CPUs) 504 for executing the jobs 110 in a parallel manner according to an embodiment. Referring to FIG. 5, the plurality of CPUs 504 may include a first CPU 504-1, a second CPU 504-2, a third CPU 504-3, and a fourth CPU 504-4. However, although four CPUs 504 are illustrated in FIG. 5, the embodiments encompass any number of CPUs 504 for use in executing the plurality of jobs 110.

Because a seller usually sells many types of product simultaneously and the shipping schedule of one product may be independent on the others, the job dispatcher 106 may schedule shipments for the products in parallel using the plurality of CPUs 504. Also, because each job may have a different number of product orders and shipments, the complexity of each sub-problem can widely vary.

As such, the complexity estimation unit 108 may estimate the complexity of each sub-problem, e.g., each job 110. Generally, the complexity estimation unit 108 may estimate the complexity of each job 110 by considering the number of related orders, prices and other possible factors. In one example, the complexity estimation unit 108 may employ an empirical function to evaluate a completion time, and based on the completion time, the job dispatcher 106 may schedule the job 110 using the plurality of CPUs 504 in a parallel manner, as explained below.

For example, there are two main factors that have an impact on the complexity of the job 110: number of shipments and number of product orders. The completion time (e.g., complexity) of a particular job 110 increases when these two variables increase. According to one embodiment, the complexity estimation unit 108 may calculate the completion time for a respective job 110 based on the following equation:

$$\text{completion time } (s) = 0.85 \times \left(\frac{\text{\# shipments}}{1000}\right)^{2.97} + 0.15 \times \left(\frac{\text{\# orders}}{1000}\right)^{2.31} \quad \text{Eq. (6)}$$

Eq. (6) is based on a function using the Maximum Likelihood Estimation (MLE) and historical data in a real business scenario. The complexity estimation unit 108 may obtain the number of shipments within a respective job 110 from the product shipment information, and the number of product orders from the product order information. Then, for each job 110, the complexity estimation unit 108 may estimate the completion time for a respective job 110, which provides an estimation of the complexity of the sub-problem.

Then, the job dispatcher 106 may assign the plurality of job 110 to the plurality of CPUs 504 based on the estimated complexity, which is, in this case, the estimated completion time (ECT). For example, the job dispatcher 106 may sort the plurality of jobs 110 by each job's ECT value. In one example, the job dispatcher 106 may assign the job with the highest ECT value to the first CPU 504-1, and then assign the job with the second-highest ECT value to the second CPU 504-2, and so forth, until reaching the last CPU, e.g., the six CPU 504-4. Then, the job dispatcher 106 may assign the job with the next highest ECT value (from the one assigned to the forth CPU 504-4), to the fourth CPU 504-4, and repeat until it runs out of jobs or reaches the first CPU 504-1.

Figure 6:
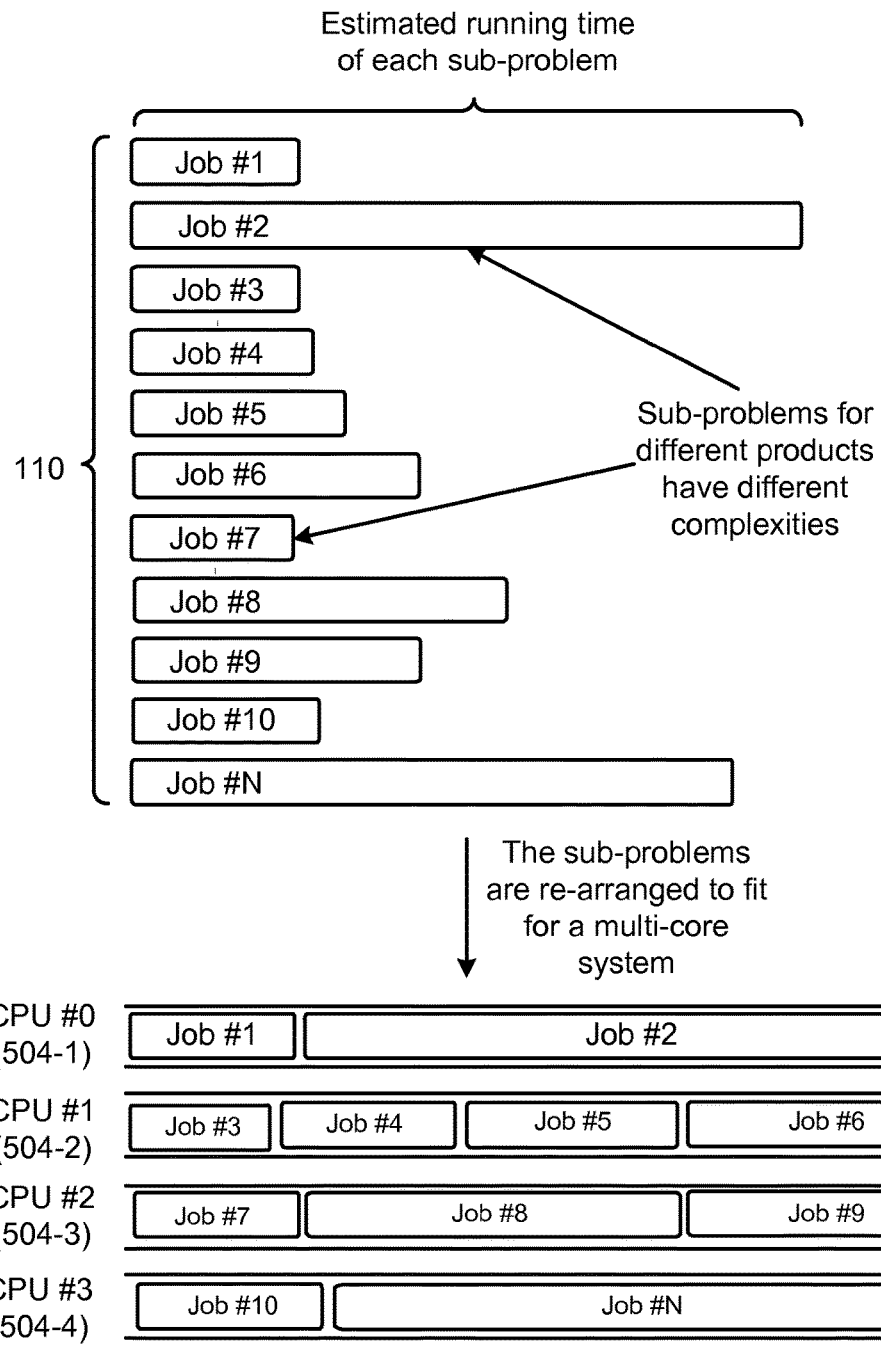
FIG. 6 illustrates a complexity of each job and the assignment of the jobs to the plurality of CPUs according to an embodiment.

FIG. 6 illustrates a complexity of each job and the assignment to the plurality of CPUs 504 according to an embodiment. For example, FIG. 6 illustrates the plurality of jobs 110 (e.g., job #1-job #N), and associated with each job 110, is the estimated complexity (e.g. the ECT value). As shown in FIG. 6, job #2 is the most complex job, and job #3 is the second most complex job among the plurality of jobs 110. The job dispatcher 106 may assign the jobs 110 to the CPUs 504 as shown in FIG. 6, which distributes in a round-robin fashion.

The pseudo-code of the assignment and execution of the plurality of CPUs 504 are provided below:

```
// n: num of threads
// cpu_job: a vector with n jobs
// pq: priority queue which stores jobs
FUNCTION greedyParallel( )
1.      BEGIN
2.        i = 1
3.        flag = true
4.        Calculate the ECT of each job
5.        Sort the job sequence by non-increasing ECT and push to pq
6.        WHILE (pq != empty)
7.          oneJob = pq.pop( );
8.            cpu_job[i].push(oneJob);
9.          IF (flag == true)
10.            i++;
11.          ELSE
12.            i--;
13.          END IF
14.          IF (i > n)
15.            i = n;
16.            flag = false;
17.          END IF
18.          IF (i < 1)
19.            i = 1;
20.            flag = true;
21.          END IF
22.        END WHILE
23.        Run the job in cpu_job[ ] in parallel
24.      END
```

The inventors of the embodiments have performed extensive experiments discover how the two most important variables, e.g., the number of shipments and the number of product orders, will affect the above-provided algorithm's performance. For instance, synthetic datasets with different sizes were generated with randomness and heuristics to simulate the real scenario of shipments and orders. The inventors built the experiment environment on an HP Z800 server with 12 cores (Intel Xeon CPU X5690@3.47 GHz) and 128G memory. The results, as discussed below, demonstrate that the two variables are the key factors for the algorithm and the number of shipments plays a more critical role for the performance. A mainstream linear programming solver as the linear solver 118 was used in the experiments.

Figure 7:
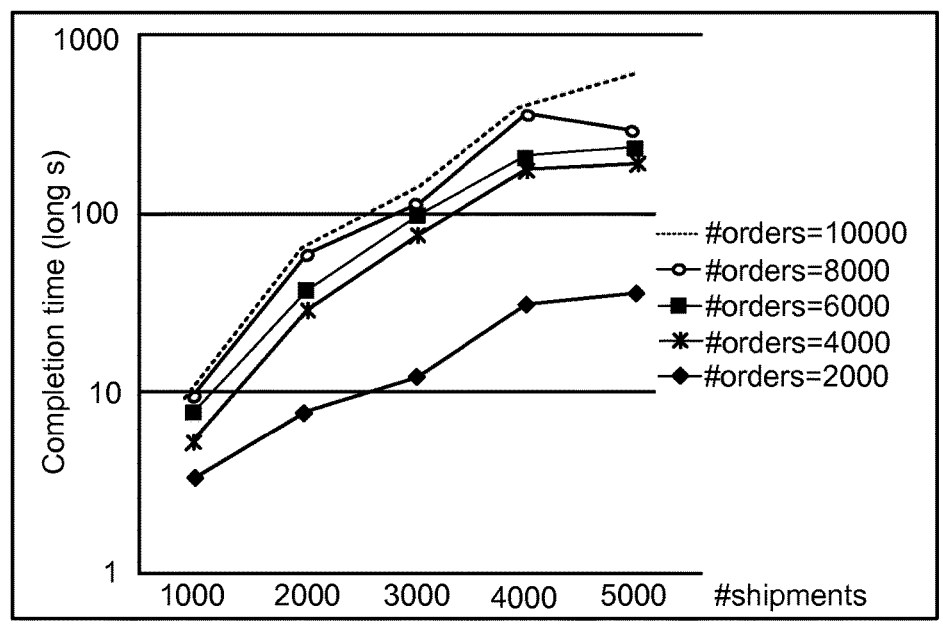
FIG. 7 depicts the change of completion time in relation to an increasing number of shipments according to an embodiment.

FIG. 7 depicts the change of completion time (in log 10 base) in relation to an increasing number of shipments according to an embodiment. Each line represents a different number of product orders respectively. Based on FIG. 7, it can be concluded that the completion time increases very quickly when the number of shipments increases, and for the different number of product orders, the same property holds. Because the number of stock availability constraints is dependent on the number of shipments, the results show that this kind of constraints has a relatively large impact on the performance. On the other hand, even for the case of #shipments=5,000 and #orders=10,000, the optimization problem can be solved within 290 seconds, which is acceptable considering the problem size.

Figure 8:
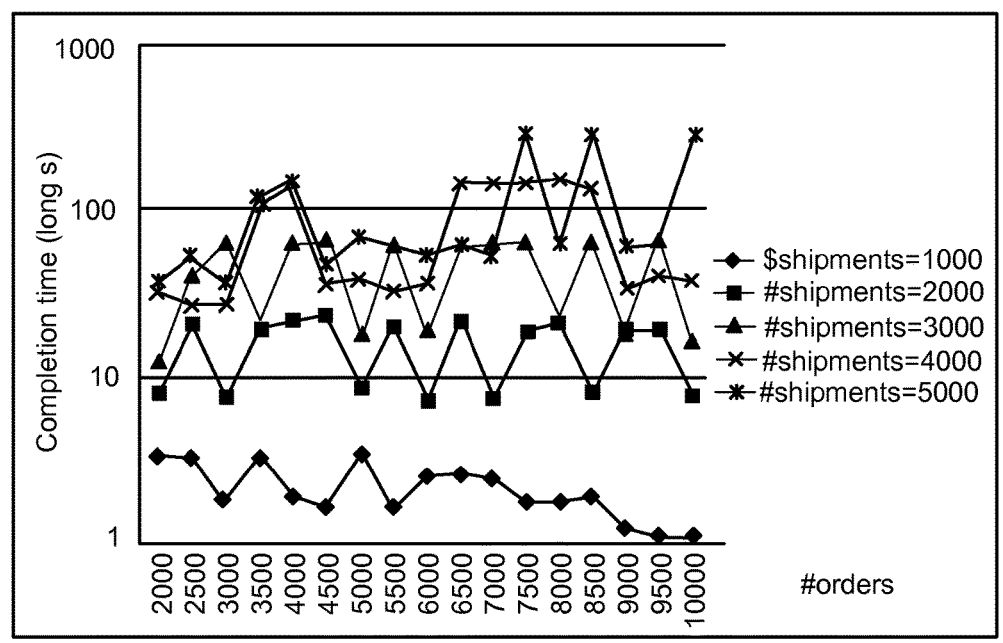
FIG. 8 illustrates the completion time for each job with respect to an increasing number of orders according to an embodiment.

FIG. 8 illustrates the completion time for each job with respect to an increasing number of orders according to an embodiment. For example, FIG. 8 demonstrates the performance change with variance of the number of product orders. As shown in FIG. 8, the number of product orders does not interfere with the completion time very much and it also confirms that the number of shipments is the key factor of the algorithm.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for matching orders with incoming shipments, the system comprising:
   at least one processor;
   a non-transitory computer-readable storage medium including instructions executable by one or more processors, the instructions configured to implement,
   a product shipment handler configured to receive product shipment information specifying incoming products;
   a product order handler configured to receive product order information specifying a plurality of product orders and input parameter information associated with each product order;
   a job dispatcher configured to create a plurality of jobs based on the product shipment information and the product order information, the job dispatcher configured to arrange and group the incoming products and the product orders by product type such that each individual job specifies incoming products and products orders corresponding to a single type of product, wherein, when a single product order specifies two or more different types of products, the job dispatcher is configured to split the single product order into multiple product orders such that each of the multiple product orders has the single type of product;
   a modeling tool configured to model each job as a separate constrained linear optimization problem; and
   a linear solver configured to generate a delivery plan for delivering products as specified by the product orders by separately solving each constrained linear optimization problem based on the input parameter information and the product shipment information such that the incoming products are matched with the product orders according to a delivery schedule that maximizes one or more business values,
   wherein the job dispatcher includes a complexity estimation unit configured to estimate a complexity of each job for solving the constrained linear optimization problem corresponding to a respective job, the job dispatcher configured to sort a list of the plurality of jobs based on the estimated complexity in either increasing or decreasing complexity, and sequentially assign the constrained linear optimization problem of each job of the sorted list to a plurality of computer processing units (CPUs).

2. The system of claim 1, wherein the product shipment handler and the product order handler are configured to periodically receive the product shipment information, and the product order information and the input parameter information via a batch job.

3. The system of claim 1, wherein the product order handler is further configured to receive secondary product order information and secondary input parameter information via an incremental job, and the linear solver is configured to solve a new constrained linear optimization problem based on results of the constrained linear optimization problem as an initial solution to the new constrained linear optimization problem, and the secondary product order information and the secondary input parameter information.

4. The system of claim 1, wherein the plurality of jobs includes a first job and a second job, the first job specifying all incoming products and products orders of a first product type, the second job specifying all incoming products and products orders of a second product type, the second product type being different than the first product type.

5. The system of claim 4, wherein the job dispatcher is configured to split the single product order into a first product order specifying only one or more products of the first product type and a second product order specifying only one or more products of the second product type,
wherein the job dispatcher is configured to combine the first product order with other product orders and incoming products of the first product type to obtain the first job,
wherein the job dispatcher is configured to combine the second product order with other product orders and incoming products of the second product type to obtain the second job.

6. The system of claim 1, wherein the complexity estimation unit is configured to estimate the complexity of each job by computing an estimated completion time (ECT) for solving the constrained linear optimization problem corresponding to a respective job, and sequentially assign the plurality of jobs to the plurality of CPUs in an order of increasing ECT, the plurality of CPUs being configured to solve at least two of the assigned jobs in parallel.

7. The system of claim 6, wherein the plurality of CPUs include a first CPU, a second CPU, and a third CPU, and the job dispatcher is configured to assign a job with a highest ECT to the first CPU, assign a job with a second highest ECT to the second CPU, and assign a job with a third highest ECT to the third CPU, the first CPU being configured to solve a first constrained linear optimization problem corresponding to the first job, the second CPU being configured to solve a second constrained linear optimization problem corresponding to the second job, the third CPU being configured to solve a third constrained linear optimization problem corresponding to the third job, wherein the first, second, and third constrained linear optimization problems are solved in parallel for at least a period of time.

8. The system of claim 1, wherein the input parameter information includes a contract delivery day, product amount for a respective product order, unit price, and penalty factors corresponding to a series of shipping dates in relation to the contract delivery day.

9. The system of claim 1, wherein the constrained linear optimization problem includes an objective function configured to maximize profit or minimize penalties for the product orders within a respective job, the objective function being subject to one or more constraints.

10. The system of claim 9, wherein the one or more constraints include a first constraint requiring that matched incoming products are less than or equal to a product amount for a respective product order, and a second constraint requiring that the matched incoming products are in stock.

11. The system of claim 1, wherein the linear solver is configured to generate the delivery plan by calculating a delivery amount for a series of days in relation to a contract delivery date and providing the delivery amount in the delivery plan.

12. The system of claim 1, wherein the linear solver is configured to generate the delivery plan by calculating at least one of a total profit and total penalty for a respective product order and providing at least one of the total profit and the total penalty in the delivery plan.

13. A non-transitory computer-readable medium storing instructions that when executed cause one or more processors to match product orders with incoming shipments, the instructions comprising instructions to:
receive product shipment information specifying incoming products;
receive product order information specifying a plurality of product orders and input parameter information associated with each product order;
create a plurality of jobs based on the product shipment information and the product order information, the incoming products and the product orders being arranged and grouped by product type such that each individual job specifies all incoming products and products orders of a single type of product, the plurality of jobs including a first job for incoming products and product orders of a first product type and a second job for incoming products and product orders of a second product type, wherein, when a single product order specifies one or more products of the first product type and one or more products of the second product type, the single product order is split into a first product order specifying only the one or more products of the first product type, and a second product order specifying only the one or more products of the second product type;
model each job as a separate constrained linear optimization problem such that the first job is modeled as a first constrained linear optimization problem and the second job is modeled as a second constrained linear optimization problem;
estimate a complexity of each job for solving the constrained linear optimization problem corresponding to a respective job, the first job having a first estimated complexity, the second job having a second estimated complexity, the first estimated complexity being higher than the second estimated complexity;
sort a list of the plurality of jobs based on the estimated complexity in either increasing or decreasing complexity;
sequentially assign each job of the sorted list to a plurality of computer processing units (CPUs) according to an order of the sorted list including assigning the second job to a first CPU of the plurality of CPUs and assigning the first job to a second CPU of the plurality of CPUs; and
generate a delivery plan for delivering products as specified by the product orders by separately solving the first constrained linear optimization problem with the second CPU and the second constrained linear optimization problem with the first CPU using the input parameter information and the product shipment information such that the incoming products are matched with the product orders according to a delivery schedule that maximizes profit, wherein the first constrained linear optimization problem of the first job is solved with the second CPU at least partially in parallel with the solving of the second constrained linear optimization problem of the second job with the first CPU.

14. The non-transitory computer-readable medium of claim 13, wherein the first constrained linear optimization problem is a first objective function configured to maximize the profit of product orders of the first product type, the first objective function being iteratively solved until converging to a first delivery plan solution, the second constrained linear optimization problem being a second objective function configured to maximize the profit of product orders of the second product type, the second objective function being iteratively solved until converging to a second delivery plan solution.

15. The non-transitory computer-readable medium of claim 13, wherein the instructions to create a plurality of jobs includes instructions to:
combine the first product order with other product orders and incoming products of the first product type to obtain the first job; and
combine the second product order with other product orders and incoming products of the second product type to obtain the second job.

16. The non-transitory computer-readable medium of claim 13, wherein the input parameter information includes a contract delivery day, product amount for a respective product order, unit price, and penalty factors corresponding to a series of shipping dates in relation to the contract delivery day.

17. The non-transitory computer-readable medium of claim 13, wherein the instructions to generate the delivery plan include instructions to:
calculate a delivery amount for at least one of a series of days in relation to a contract delivery date and providing the delivery amount in the delivery plan.

18. The non-transitory computer-readable medium of claim 13, wherein the instructions to generate the delivery plan include instructions to:
calculate at least one of a total profit and total penalty for a respective product order and provide at least one of the total profit and the total penalty in the delivery plan.

19. A method for matching orders with incoming shipments performed by one or more processors, the method comprising:
receiving product shipment information specifying incoming products;
receiving product order information specifying a plurality of product orders and input parameter information associated with each product order;
creating a plurality of jobs based on the product shipment information and the product order information including arranging and grouping the incoming products and the product orders by product type such that each individual job includes all incoming products and products orders corresponding to a single type of product, the plurality of jobs including a first job for incoming products and product orders of a first product type and a second job for incoming products and product orders of a second product type, wherein, when a single product order specifies one or more products of the first product type and one or more products of the second product type, the single product order is split into a first product order specifying only the one or more products of the first product type, and a second product order specifying only the one or more products of the second product type;
modeling each job as a separate constrained linear optimization problem such that the first job is modeled as a first constrained linear optimization problem and the second job is modeled as a second constrained linear optimization problem;
estimating a complexity of solving the first constrained linear optimization problem based on a number of shipments for the incoming products and a number of product orders of the first product type, and estimating a complexity of solving the second constrained linear optimization problem based on a number of shipments for the incoming products and a number of product orders of the second product type, the first job having a first estimated complexity, the second job having a second estimated complexity, the first estimated complexity being higher than the second estimated complexity;
sorting a list of the plurality of jobs based on the estimated complexity in either increasing or decreasing complexity;
sequentially assigning the plurality of jobs to a plurality of computer processing units (CPUs) in an order of the sorted list based on the estimated complexity such that the first job is assigned to a second CPU of the plurality of CPUs and a second job is assigned to a first CPU of the plurality of CPUs; and
generating a delivery plan that maximizes one or more business values by separately solving the first constrained linear optimization problem using the second CPU and the second constrained linear optimization problem using the first CPU, wherein the first constrained linear optimization problem is solved at least partially in parallel with the second constrained linear optimization problem.

* * * * *